Jan. 21, 1941. C. D. HOWARD 2,229,570
WELDING APPARATUS
Filed Sept. 26, 1938 7 Sheets-Sheet 2

Jan. 21, 1941.  C. D. HOWARD  2,229,570
WELDING APPARATUS
Filed Sept. 26, 1938  7 Sheets-Sheet 5

FIG. 8.

INVENTOR
Cecil D. Howard
BY
ATTORNEYS

WITNESS:

Jan. 21, 1941. C. D. HOWARD 2,229,570
WELDING APPARATUS
Filed Sept. 26, 1938 7 Sheets-Sheet 7

INVENTOR
Cecil D. Howard
BY
ATTORNEYS

WITNESS:

Patented Jan. 21, 1941

2,229,570

UNITED STATES PATENT OFFICE 2,229,570

WELDING APPARATUS

Cecil D. Howard, Swarthmore, Pa., assignor to Sun Shipbuilding & Dry Dock Company, Chester, Pa., a corporation of Pennsylvania Application September 26, 1938, Serial No. 231,721

14 Claims. (Cl. 219—8)

This invention relates to welding apparatus, and more particularly to apparatus for welding shapes to plates.

Generally speaking, the apparatus in accordance with this invention comprises a tilting table of unique construction in combination with a welding head arranged for the welding of work supported on the table.

Having now indicated in a general way the nature and purpose of this invention I will proceed to a detailed description of a preferred embodiment thereof with reference to the accompanying drawings, in which.

As will appear from the following description with reference to the drawings, a preferred embodiment of the invention comprises a table for the support of work to be welded and arranged to be positioned in a horizontal plane or at various angles within wide limits, in combination with a welding head supported from the table and arranged for movement longitudinally of the table to position it in operative relation to work on the table and for movement transversely of the table for effecting welding of the work. Variously the details of construction of the apparatus and its mode of operation will appear from the following description.

In the several figures included in the drawings 1 indicates a pair of suitably braced A-frames mounted on suitable footings 2 in the ground. The A frames support journals or bearings 3 in which is mounted a shaft 4, carrying a segmental gear 5 intermediate the frames 1. Mounted on a platform 6, supported from the bracing member 7 of the frames 1, is an electric motor 8 arranged to drive a gear 9, engaged with the segmental gear 5, through a reduction gearing 10.

Secured in spaced relation to the shaft 4 intermediate their ends are a pair of I-beams 11 to which are secured in spaced relation a series of cross-members 12, which serve with the beams 11 to form a table movable about the axis of shaft 4 when the shaft is turned on operation of motor 8 through the medium of gearings 5 and 9.

Figures 1, 2, 3:
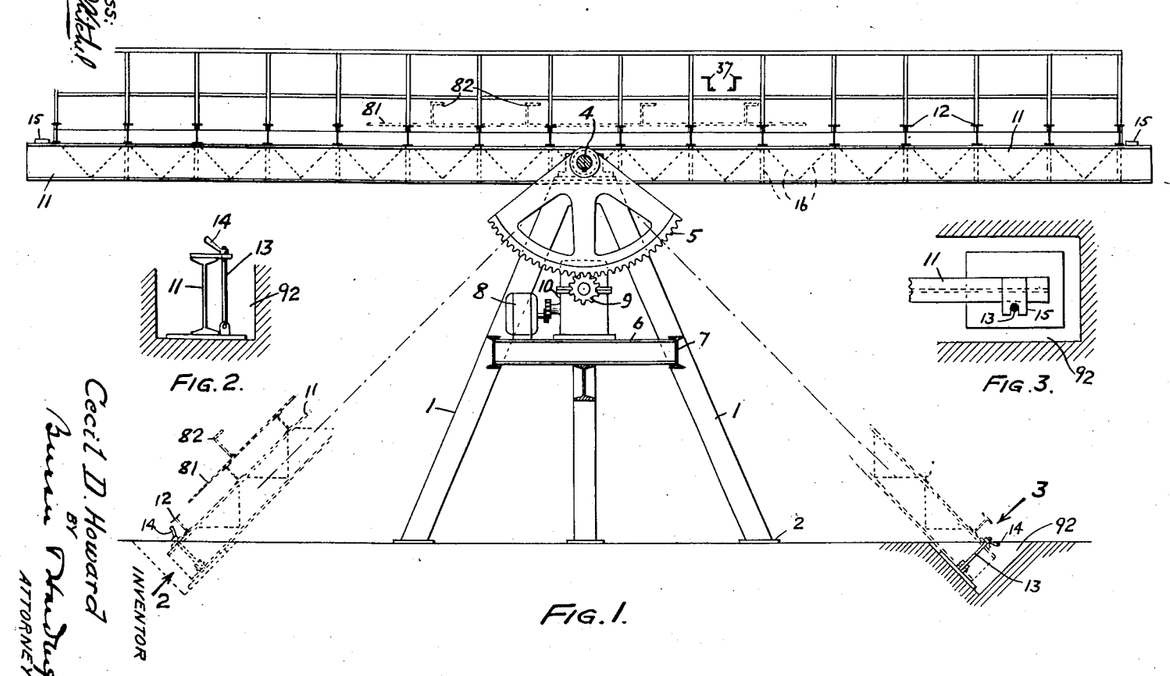
Figure 1 is a longitudinal sectional view of apparatus according to this invention.
Figure 2 is an elevation showing a detail of construction.
Figure 3 is a plan view of the subject of Figure 2.

The I-beams 11 are of a length such that, as shown by dotted lines in Figure 1, when the table is turned, in either direction, to an angle of say about 45° to the horizontal the end portions of the beams will be in depressions 92 formed in the ground and in which are secured rods 13 pivoted at one end and provided at the other with threaded wing nuts 14. Adjacent to the ends of the beams 11 are secured slotted plates 15 adapted to be engaged by the rods 13 enabling the table to be locked, in the position indicated, by the wing nuts 14, as shown in Figures 1–3.

Suitably supported by braces 16 and extending along the sides of the table are a series of step members 17 of equal height and arranged at right angles to the end that they will respectively form treads and risers when the table is tilted with either end up.

Figure 6:
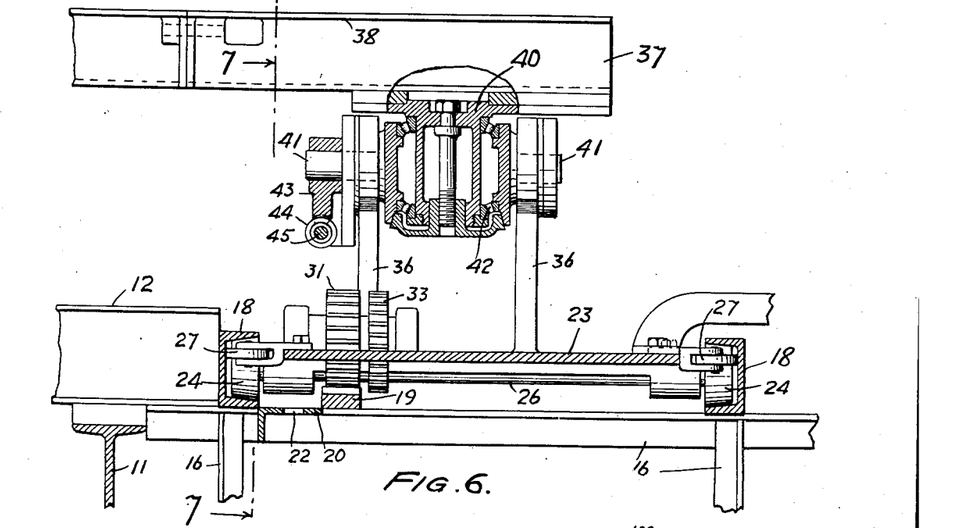
Figure 6 is a sectional view showing details of construction.
Figures 7, 13:
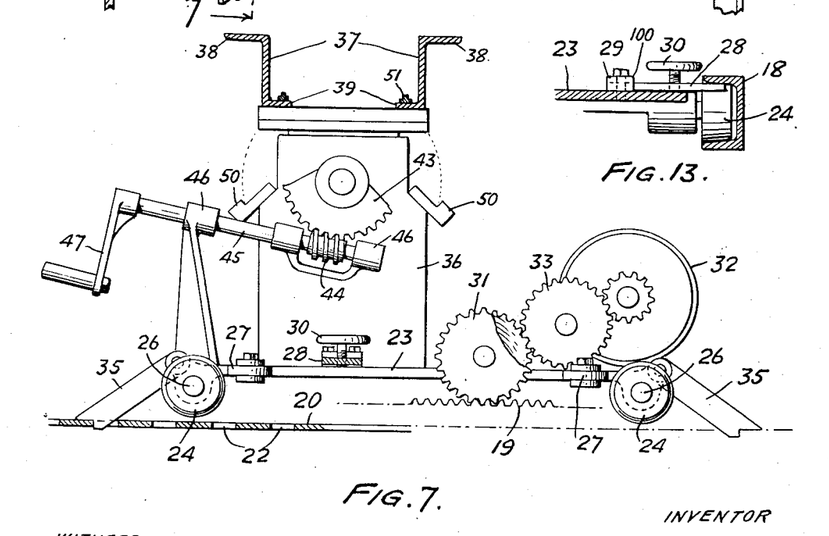
Figure 7 is a sectional view on line 7—7 of Figure 6.

Extending along one side of the table and supported on the braces 16 are a pair of rails 18, formed by oppositely facing structural channel members, intermediate of which extends a rack 19, adjacent to and parallel with which extends a plate 20 provided with closely spaced slots 22. A carriage 23 is mounted to travel on the rails 18 through the medium of wheels 24 tapered to match the rails 18 and carried on axles 26 beneath the carriage. The carriage is also provided with horizontally disposed guide wheels 27 adapted to engage the rails 18, as shown in Figure 6, and the carriage is adapted to be locked in any given position by means of clamp members 28, each of which is loosely held to the carriage by a yoke 100 secured by a bolt 29 and adapted to be clamped to a rail 18 by a screw 30 threaded through the clamp member and bearing on the carriage, as shown in Figure 13.

The carriage 23 is adapted to be driven along the length of the table by means of a pinion gear 31 engaged with the rack 19 and adapted to be driven by an electric motor 32 through reduction gearing and gearing 33. The motor 32 receives current from any suitable source. At the front and rear of the carriage 23 are pawls 35, adapted respectively, depending upon the direction of movement of the carriage, to drag behind the carriage over plate 20 for engagement in one of the apertures 22 to hold the carriage from moving backward on stopping.

Supported on the carriage 23, from a pair of supports 36, is a bridge member formed by a pair of spaced parallel members 37 having outwardly extending flanges 38 extending from their upper edges and inwardly extending flanges 39 extending from their lower edges.

The members 37 are secured adjacent one end to a pivot member 40 adapted to be supported from and to rotate with respect to trunnions 41 bearing in the supports 36, through the medium of roller bearings 42. A segmental gear 43 carried by one of the trunnions 41 is in mesh with a worm 44 on the end of a shaft 45 supported in bearings 46 and adapted to be turned by a hand crank 47, for turning the pivot member 40 and the bridge on the axis of the trunnions 41 to maintain it in a horizontal position as the table is tilted. Stops 50 are positioned on the supports 36 to receive and support the bridge when it is turned in either direction in conformance with the tilting of the table in either direction.

The members 37, forming the bridge, are connected at their ends remote from the carriage 23 by a member 42, which extends beyond the side of the table, to which is attached, by means of a hinge 43, a bracket 44, to which is pivotally secured a bracket 45 carrying on its lower end a clamping member 46 adapted to be engaged with a flanged member 47 extending lengthwise of the table in order to steady the bridge. The bracket 44 is provided with holes 48 for the passage of a bolt 49 passing through bracket 45 and permitting its adjustment with respect to bracket 44 as the bridge may be adjusted about the axis of the trunnions 41.

Secured to the flanges 39 of members 37 are rails 51 upon which ride wheels 52 supporting a carriage 53 at the rear end of which in turn are supported guide wheels 93 which engage under flanges 38 and prevent tipping up of the carriage. One of the wheels 52 is grooved and its corresponding rail is formed to engage within the groove to guide the carriage.

On the carriage 53 is mounted an electric motor 54 which is adapted to drive the carriage through the medium of a worm 55 in engagement with a pinion 56 secured in driving relation with one of the wheels 52.

Mounted on the carriage is a support 57 with which is slidably engaged a bracket 58, carrying a rack 59. A pinion 60 arranged to be turned by a crank 61 is mounted on the support 57 in engagement with the rack 59, for raising and lowering the bracket 58. A pawl 66 is related to a ratchet 86 operating to hold the bracket 58 in adjusted position.

The bracket 58 carries a pivot pin 62 to which is keyed a bracket 63. A clamp member 64 supported from bracket 58 embraces the pivot pin and is adapted to be tightened by a screw 65 to prevent pin 62 from turning.

A bracket 67 for an electric welding head 101 is mounted for rotation through 180° on an arm 68 pivotally supported from bracket 63 and adapted to be fixed in raised or lowered position by the passage of a pin 69 through one or the other of a pair of holes 70 in a plate 71 supported from the bracket. The bracket 67 is clamped in either of its two positions 180° apart by means of screw clamps 87.

The welding head 101 is provided with the usual connections for electric welding, with welding wire 72 from a reel 73 and with flux through a nozzle 74 connected to a hopper 75 through a flexible conduit 76. Electric welding current may be supplied through the medium of a conducting shoe 85 (Fig. 4) arranged to run on a charged rail 84, suitably supported from the bracing 16.

Figures 9, 10:
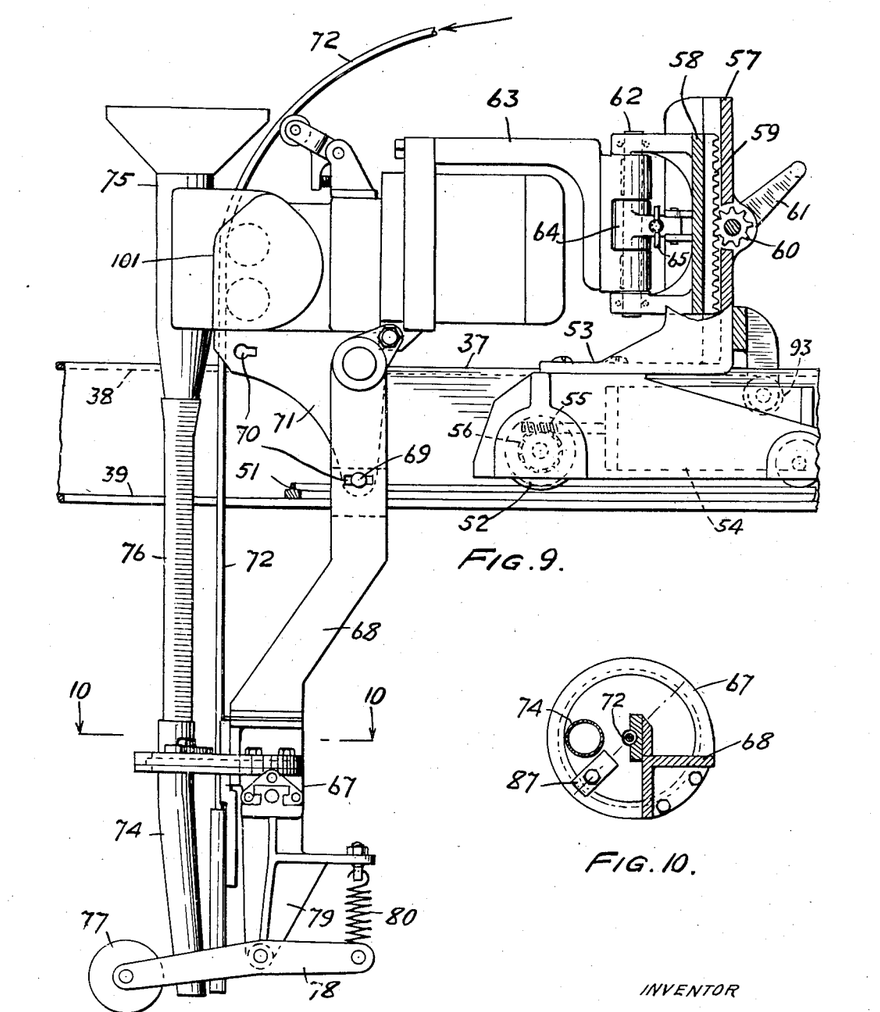
Figure 9 is a sectional view partially broken away showing a mounting for a welding head.
Figure 10 is a sectional view on line 10—10 of Figure 9.
Figure 14:
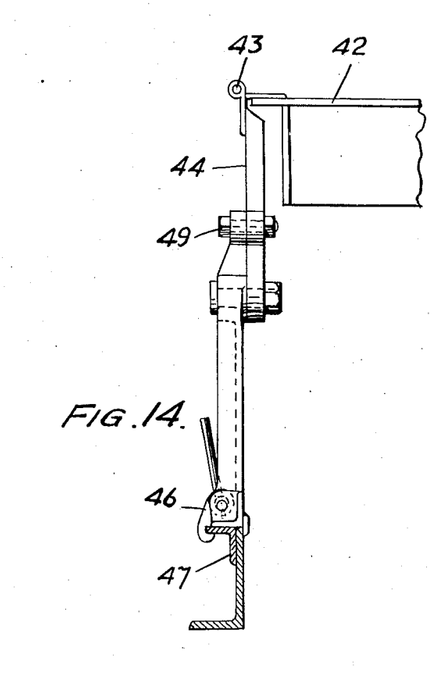
Figure 15:
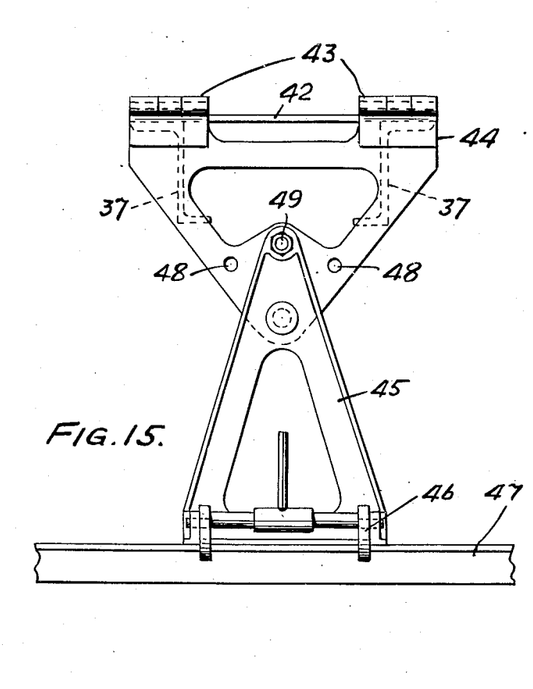

The bracket 67 (Fig. 9) is provided with a guide wheel 77 carried on the end of a lever 78 pivoted to a bracket 79 attached to the head. A spring 80 holds the guide wheel in lowered position.

Figures 4, 11, 12:
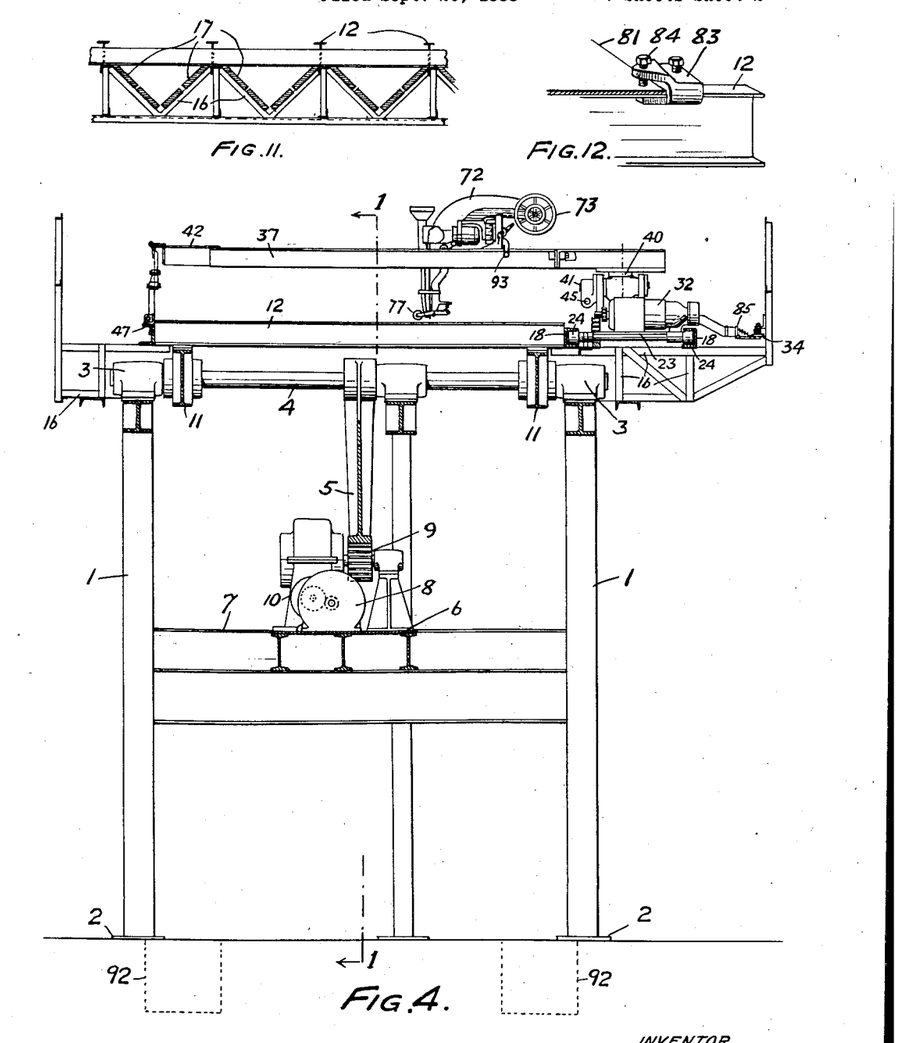
Figure 4 is a cross-sectional view of the apparatus shown in Figure 1.
Figure 11 is a sectional view on line 11—11 of Figure 5.
Figures 12–15 are fragmentary views showing details of construction.
Figure 5:
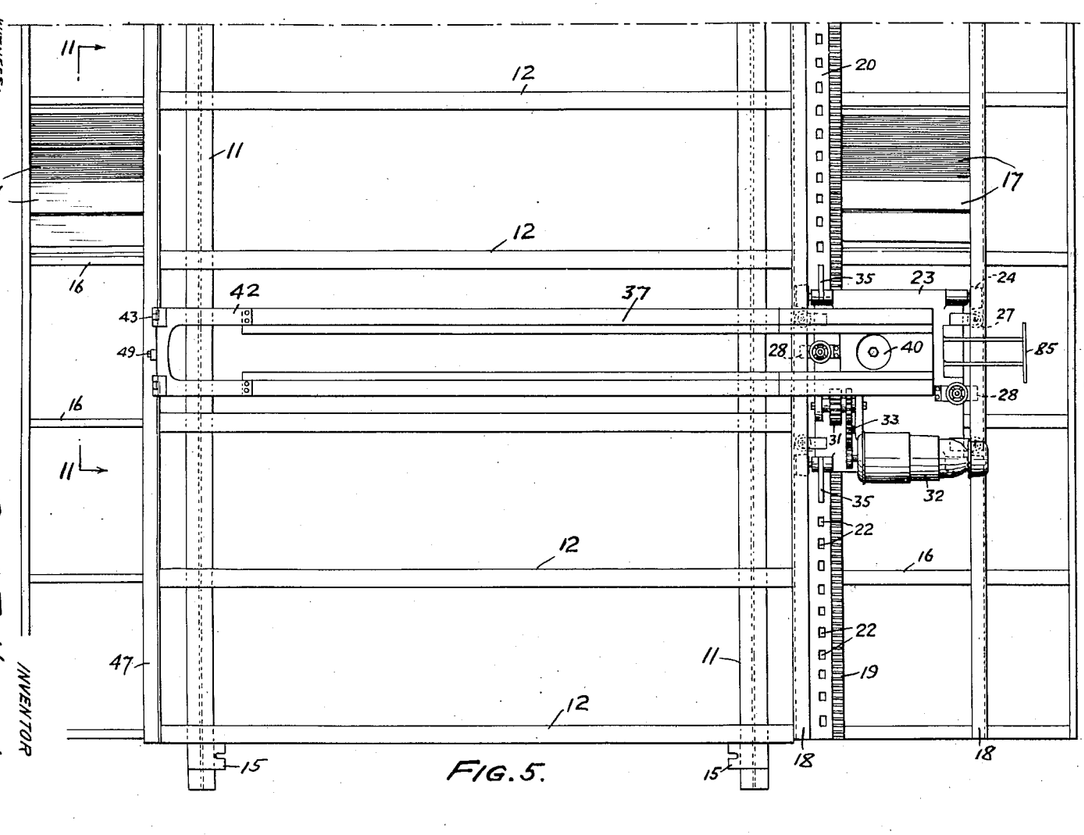
Figure 5 is a partial plan view of the apparatus shown in Figure 1.

In operation of the table in connection with welding, for example, stiffeners 82 to a plate 81, the table is placed in a horizontal position and the plate with the stiffeners tack-welded thereto is placed on the table, as shown in Figure 1. The plate is secured to the cross members 12 by clamp members 83, as shown in Figure 12.

For convenience, in placing and securing the plate 81 on the table the bridge formed by members 37 and carrying the welding head as above described is turned away from the table on the pivot member 40, the welding head being raised out of the way and secured by engagement of the pin 69 in the upper hole 70 in the plate member 71.

The work having been secured to the table, the table is tilted by operation of the motor 8. The table may be tilted in either direction and is tilted until it assumes either of the positions at an angle of about 45°, shown in Figure 1, with one end in a depression 92. The table is then locked in tilted position by engagement of rods 13 in slotted members 15, and tightening up the wing nuts 14.

The bridge formed by members 37 is then moved back to extend transversely of the table above the work thereon. The welding head is moved on the bridge, by operation of the motor 54 or by ungearing and hand manipulation, to one end or the other of the bridge and the bridge is moved lengthwise of the table by operation of the motor 32 to position the welding head over the line of weld to effect, for example, fillet welding of one of the stiffeners 82 to the plate 81.

Figure 8:
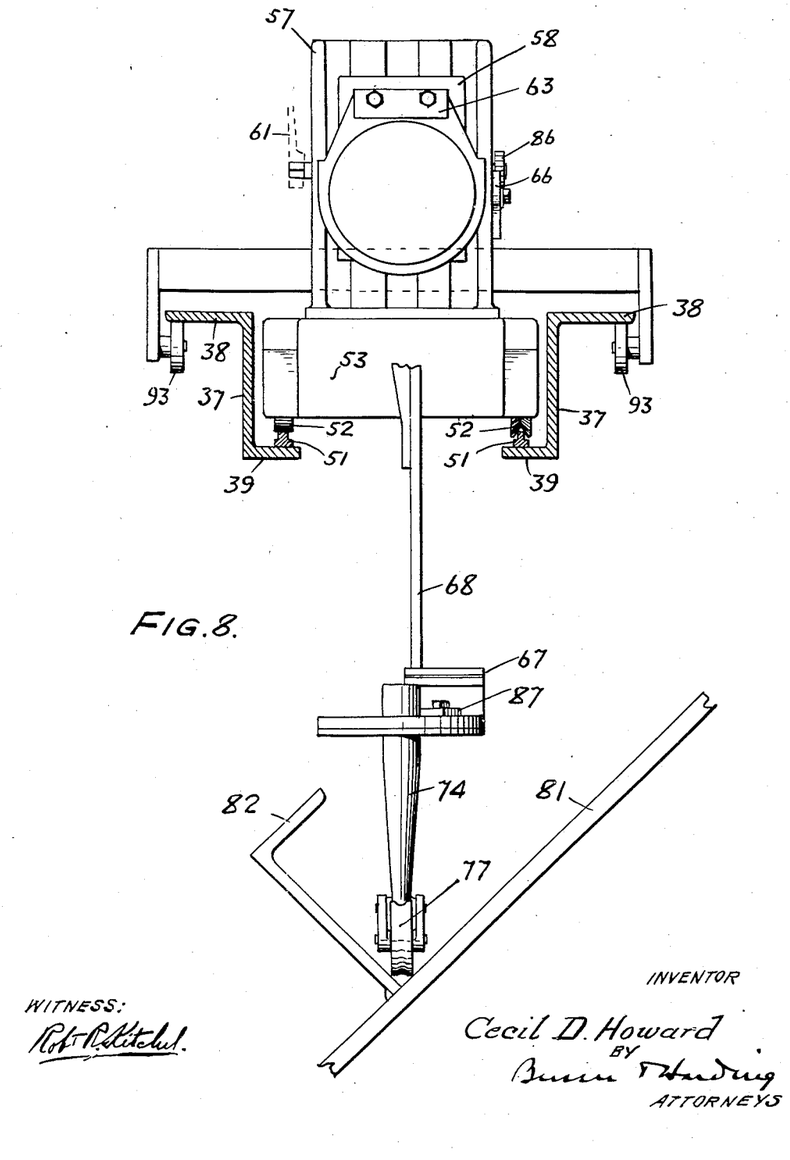
Figure 8 is a sectional view showing a detail of construction.

Since the plate is lying at an angle to the horizontal, the bridge is turned on the trunnions 41 by operation of the worm 44 and gear 43 by turning the handle 47. The welding head is then vertically adjusted with respect to the line of weld by turning handle 61 for the raising or lowering of the sliding bracket 58 through the medium of pinion 60 and rack 59. The welding head having been adjusted by turning the bridge on the trunnions 41 and adjustment of sliding bracket 58 the arm is steadied by adjustment of the clamping member 46, the bracket 45 being secured to the bracket 44 by passage of the bolt 49 through the right or left hand hole 48 in the bracket 44, depending upon which way the bridge was adjusted on its longitudinal axis. The clamp member 64 is released to enable the welding head to follow the line of weld under the guidance of the guide wheel 77 which runs in the angle between the stiffener 82 and the plate 81, as shown in Figure 8, it being noted that with release of the clamping member 64 the welding head unit is capable of swinging on the pivot 62 under the guidance of the guide wheel.

The welder is then put in operation and is advanced along the line of weld by operation of the motor 54 which serves to drive the carriage 53 supporting the welding head unit.

On completion of a line of weld the welding head is raised by turning the supporting arm 68 on its pivot and the bridge is moved, by operation of the motor 32, or by hand, lengthwise of the table to position it for welding the next adjacent stiffener, which is accomplished after the guide 67 is lowered and turned 180° by reverse movement of the carriage 53 with the welding head in operation.

The operation is repeated for effecting the welding of all the stiffeners along one side. The table is then tilted in the opposite direction, and the operation again repeated for welding all the stiffeners on the other side.

When welding of the work is completed the bridge is turned away from the table on the pivot 40, enabling the work to be readily removed from the table.

In order to enable operatives to effect the necessary adjustments of the bridge and of the welding head and to enable observation of the welding as it proceeds, the members 17 are provided at the sides of the table. The members 17 are, as has been indicated, so arranged and proportioned as to form steps when the table is tilted in either direction, enabling the operatives to easily proceed from one end of the table to the other when it is tilted.

It will be appreciated that the above detailed description is of a preferred embodiment of this invention and is given by way of illustration and not by way of limitation, it being understood that various modification in detail may be made without departing from the scope of the invention.

What I claim and desire to protect by Letters Patent is:

1. Welding apparatus comprising in combination a tilting table for the support of work to be welded, a carriage mounted on and wholly supported by said table and adapted for movement with respect to said table in a direction at right angles to its tilting axis, a bridge supported from the carriage and adapted to extend at an angle to the direction of movement of the carriage, and a welding head supported from the bridge and adapted for movement lengthwise thereof.

2. Welding apparatus comprising in combination a tilting table for the support of work to be welded, a carriage adapted for movement with respect to said table in a direction at right angles to its tilting axis, a bridge supported from the carriage and adapted to extend at an angle to the direction of movement of the carriage, a welding head supported from the bridge and adapted for movement lengthwise thereof, and releasable clamping means engaging the table and the end of the bridge remote from the carriage.

3. Welding apparatus comprising in combination a tilting table for the support of work to be welded, a carriage mounted on and wholly supported by said table and adapted for movement with respect to said table in a direction at right angles to its tilting axis, a bridge supported from the carriage and adapted to extend at an angle to the direction of movement of the carriage, and a welding head turnably supported from the bridge and adapted for movement lengthwise thereof.

4. Welding apparatus comprising in combination a tilting table for the support of work to be welded, a carriage mounted on and wholly supported by said table and adapted for movement with respect to said table in a direction at right angles to its tilting axis, a bridge supported from the carriage on a horizontal pivot and adapted to extend at an angle to the direction of movement of the carriage, means for turning the bridge on its horizontal pivotal support from the carriage, and a welding head supported from the bridge and adapted for movement lengthwise thereof.

5. Welding apparatus comprising in combination a tilting table for the support of work to be welded, a carriage mounted on and wholly supported by said table and adapted for movement with respect to said table in a direction at right angles to its tilting axis, a bridge supported from the carriage for movement about a vertical axis and for movement about its horizontal axis, means for turning the bridge on its horizontal axis, and a welding head supported from the bridge and adapted for movement lengthwise thereof.

6. Welding apparatus comprising in combination a tilting table for the support of work to be welded, a carriage mounted on and wholly supported by said table and adapted for movement with respect to said table in a direction at right angles to its tilting axis, a bridge supported from the carriage and adapted to extend at an angle to the direction of movement of the carriage, a welding head supported from the bridge and adapted for movement lengthwise and vertically thereof, and means for moving the welding head vertically with respect to the bridge.

7. Welding apparatus comprising in combination a tilting table for the support of work to be welded, a carriage mounted on and wholly supported by said table and adapted for movement with respect to said table in a direction at right angles to its tilting axis, a bridge supported from the carriage for movement about a vertical axis and for movement about its horizontal axis, means for turning the bridge on its horizontal axis, a welding head supported from the bridge and adapted for movement lengthwise and vertically thereof, and means for moving the welding head vertically with respect to the bridge.

8. Welding apparatus comprising in combination a tilting table for the support of work to be welded, a carriage mounted on and wholly supported by said table adapted for movement with respect to said table in a direction at right angles to its tilting axis, a bridge, supports extending from the carriage, trunnions bearing in said supports, pivot means carried by the carriage and extending at right angles to the axis of said trunnions and connecting said bridge with said trunnions, and a welding head supported from said bridge and adapted for movement lengthwise thereof.

9. Welding apparatus comprising in combination a tilting table for the support of work to be welded, a carriage mounted on and wholly supported by said table adapted for movement with respect to said table in a direction at right angles to its tilting axis, a bridge supported from the carriage and adapted to extend at an angle to the direction of movement of the carriage, a carriage mounted on said bridge and adapted for movement lengthwise thereof, a support extending from said carriage mounted on the bridge, a bracket slidably supported from said support, and a welding head supported from said bracket.

10. Welding apparatus comprising in combination a tilting table for the support of work to be welded, a carriage mounted on and wholly supported by said table and adapted for movement with respect to said table in a direction at right angles to its tilting axis, a bridge supported from the carriage and adapted to extend at an angle to the direction of movement of the carriage, a carriage mounted on said bridge and adapted for movement lengthwise thereof, a support extending from said carriage mounted on the bridge, a bracket slidably supported from said support, a rack on said slidable bracket, a pinion on said support in engagement with said rack, means for rotating said pinion and a welding head supported from said slidable bracket.

11. Welding apparatus comprising in combination a tilting table for the support of work to be welded, a carriage mounted on and wholly supported by said table and adapted for movement with respect to said table in a direction at right angles to its tilting axis, a bridge supported from the carriage and adapted to extend at an angle to the direction of movement of the carriage, a carriage mounted on said bridge and adapted for movement lengthwise thereof, a support extending from said carriage mounted on the bridge, a bracket slidably supported from said support, a rack on said slidable bracket, a pinion on said support in engagement with said rack, means for rotating said pinion, and a welding head pivotally supported from said slidable bracket on an axis parallel to the direction of movement of said bracket.

12. Welding apparatus comprising in combination a pair of A frames supported on a base, a shaft journalled in said frames adjacent their apices, a table of a length in excess of twice the height of the shaft from the base mounted intermediate its ends on said shaft, a segmental gear mounted on said shaft, means for driving said gear to tilt the table, depressions in the base adapted to receive the ends of the table when in tilted position, locking means in said depressions adapted to engage an end of the table when in tilted position, a carriage mounted on and wholly supported by said table and movable with respect to said table in a direction at right angles to its tilting axis, a bridge supported from the carriage and adapted to be extended at an angle to the direction of movement of the carriage, and a welding head turnably supported from the bridge and adapted for movement lengthwise thereof.

13. Welding apparatus comprising, in combination, a tilting table for the support of work to be welded, a carriage mounted on and wholly supported by said table and a rack supported by and extending with respect to said table in a direction at right angles to its tilting axis, a pinion carried by the carriage and in engagement with the rack and a prime mover carried by the carriage and adapted to drive said pinion, a bridge supported from the carriage and adapted to extend at an angle to the direction of movement of the carriage, and a welding head supported from the bridge and adapted for movement lengthwise thereof.

14. Welding apparatus comprising, in combination, a pair of A frames, a shaft journalled in said frames adjacent their apices, a table mounted on said shaft, a segmental gear mounted on said shaft, means for driving said gear to tilt the table, locking means adapted to engage an end of the table when in tilted position, a carriage mounted on and wholly supported by said table and movable with respect to said table in a direction at right angles to its tilting axis, a bridge supported from the carriage and adapted to be extended at an angle to the direction of movement of the carriage, and a welding head turnably supported from the bridge and adapted for movement lengthwise thereof.

CECIL D. HOWARD.